United States Patent
Huf

[11] Patent Number: 6,093,238
[45] Date of Patent: Jul. 25, 2000

[54] SYSTEM FOR SUPPLYING AIR TO AIRCRAFT PRESSURIZED CABINS

[76] Inventor: Hans Joachim Huf, Am Grossberg 36, 55130 Mainz, Germany

[21] Appl. No.: 08/965,164

[22] Filed: Nov. 6, 1997

[30] Foreign Application Priority Data

Nov. 6, 1996 [DE] Germany .......................... 196 45 764

[51] Int. Cl.[7] ............................. B01D 53/22; B01D 69/08
[52] U.S. Cl. .......................................... 96/8; 95/22; 95/54
[58] Field of Search .................................. 95/19, 22, 45, 95/50, 52, 54, 139; 96/4, 8, 10

[56] References Cited

U.S. PATENT DOCUMENTS

| | | | |
|---|---|---|---|
| 3,922,149 | 11/1975 | Ruder et al. ................................. | 95/22 |
| 3,930,813 | 1/1976 | Gessner ....................................... | 95/54 |
| 3,930,814 | 1/1976 | Gessner ....................................... | 95/19 |
| 3,976,451 | 8/1976 | Blackmer et al. ....................... | 95/54 X |
| 4,198,213 | 4/1980 | Mannatt .................................... | 95/54 |
| 4,421,529 | 12/1983 | Revak et al. .............................. | 95/54 |
| 4,681,602 | 7/1987 | Glenn et al. ........................... | 95/54 X |
| 4,781,907 | 11/1988 | McNeill .................................. | 95/54 X |
| 4,857,082 | 8/1989 | DiMartino, Sr. et al. .................. | 95/19 |
| 4,881,953 | 11/1989 | Prasad et al. ............................ | 95/54 X |
| 5,069,692 | 12/1991 | Grennan et al. ............................... | 96/4 |
| 5,071,453 | 12/1991 | Hradek et al. .......................... | 95/19 X |
| 5,125,937 | 6/1992 | Sadkowski et al. .......................... | 96/8 |
| 5,169,415 | 12/1992 | Roettger et al. ............................. | 95/54 |
| 5,470,379 | 11/1995 | Garrett ................................... | 95/54 X |
| 5,531,220 | 7/1996 | Cassidy ................................ | 95/139 X |
| 5,700,310 | 12/1997 | Bowman et al. ....................... | 95/54 X |

FOREIGN PATENT DOCUMENTS

| | | | |
|---|---|---|---|
| 0250235 | 12/1987 | European Pat. Off. .................... | 95/19 |
| 0294036 | 12/1988 | European Pat. Off. .................... | 95/54 |
| 2029257 | 3/1980 | United Kingdom ....................... | 95/22 |
| 2122103 | 1/1984 | United Kingdom ......................... | 96/8 |

*Primary Examiner*—Robert H. Spitzer

[57] ABSTRACT

A system for oxygen enrichment of fresh air is used as a module in the environmental control system of aircraft cabins. Due to the increased oxygen partial pressure, the total air pressure in the aircraft cabin may be reduced, thus leading to increased cost economies in design and/or operation. The module provides oxygen-enriched fresh and recirculated air that is free of any particulate and gaseous pollutants, especially ozone and carbon dioxide.

5 Claims, 2 Drawing Sheets

SYSTEM FOR SUPPLYING AIR TO AIRCRAFT PRESSURIZED CABINS

BACKGROUND OF THE INVENTION

1. Field of the Invention

The invention relates to a system for air supply, and more particularly, to a system for supplying air to pressurized aircraft cabins.

2. Description of Relevant Art

Modern aviation with fast, high-flying aircraft requires pressurized cabins. On long range flights, the flying altitude is approximately 30,000 feet, which corresponds to approximately 10,000 meters. Since the outside pressure at 10,000 meters is only approximately 265 mb compared to 1,016 mb at sea level, the respective oxygen partial pressure is only 77 mb, assuming no change in air composition from sea level to altitude. Humans cannot survive in such thin air. Thus, aircraft are equipped with pressurized cabins. The current international convention is to have all aircraft cabin pressures at 737 mb. This corresponds to an altitude of approximately 8,500 feet or approximately 2,600 meters. The resulting high pressure differential between inside the cabin and outside the cabin at altitude poses a major task and problem for the construction of an aircraft pressure hull. The skin Is under considerable stress, and the fuselage is expanded. For economic reasons (improved fuel economy), higher cruising altitudes of approximately 40,000 feet are desirable. A trade-off arises between the increased fuel economy and the added weight to provide the required extra mechanical stability. An alternative approach consists of reducing the cabin pressure to, for example, 540 mb. This corresponds to an altitude of 16,400 feet, or approximately 5,000 meters. At this absolute air pressure, the respective oxygen partial pressure is only 113 mb, compared to 213 mb at a sea level ground pressure of 1,016 mb. Such low oxygen pressure would eventually cause most passengers to faint. To prevent passengers from experiencing oxygen deficiencies under conditions of sudden pressure loss, each aircraft is equipped with individual oxygen masks that drop from the overhead luggage compartment for fast and convenient application to the passengers' faces.

SUMMARY OF THE INVENTION

The object of the present invention is to provide a system to reduce the cabin pressure (with the resulting benefits for the cost of economy of the aircraft) while preventing detrimental effects to the health of the passengers and crew. This object is achieved by a system for supplying air to pressurized aircraft cabins, in which fresh air that is ducted into the cabins is filtered and cleaned of gaseous pollutants, and the system includes a device for oxygen enriching the oxygen content of the fresh air.

By varying the composition of air, i.e., enriching the oxygen content from approximately 20 to 40 percent, the oxygen partial pressure in a cabin with an overall pressure corresponding to 5,000 m or 16,400 feet may be set at, e.g., 216 mb. This is slightly more than at sea level. Thus, any oxygen deficiency problems for passengers and cabin crew could be avoided. Actually, passengers may be provided with a somewhat increased amount of oxygen as a proactive measure against air-sickness.

The reduced cabin pressure allows either a lighter construction of the fuselage or a desirable higher ceiling. Each case leads to improved fuel economy.

It is especially advantageous if the oxygen enrichment system includes at least one membrane module that separates oxygen from incoming fresh outside air. Such a membrane module may contain a hollow fiber membrane. The hollow fiber technology for gas separation is well known and is being applied in various other technology areas. Most predominant is the application to the production of nitrogen from air, where oxygen is separated from air to gain pure nitrogen. Such industrial units are offered in the market by companies such as Aquilo Gas Separation B.V. (Netherlands), Permea Inc. (St. Louis, Mo., U.S.A.), and Generon Systems Inc. (Houston, Tex., U.S.A.). The hollow fiber technology is based on the phenomenon that different gases (with different molecular sizes) diffuse through a membrane at different speeds. Thus, if compressed air is pressed through a membrane, the "fast" gases (oxygen, carbon dioxide, and water vapor) pass through the filter faster than the relatively "slow" nitrogen. This process is used for low cost production of large industrial quantities of nitrogen. It can also be used to produce oxygen enriched air. The efficiency depends on the type of membrane used, the applied pressure, and the temperature. An added advantage is the fact that the oxygen enriched air emerging on the low pressure side of the membrane is absolutely dust and bacteria free. In addition, the membranes require no maintenance, since they are void of moving parts. As indicated previously, the separation efficiency depends on the pressure on the inlet side of the membrane filter. Thus, it is customary to include an air compressor in a membrane module that compresses the air on the inlet side to, e.g., 4 to 12 bars. The oxygen partial pressure can then be pre-selected and used as the control parameter for the cabin atmosphere. In order to reduce the required amount of fresh oxygen enriched air, the warm cabin air can be cleaned and re-circulated.

BRIEF DESCRIPTION OF THE DRAWINGS

The invention will now be described, taken together with the drawings, in which.

DETAILED DESCRIPTION OF PREFERRED EMBODIMENTS

Figure 1:
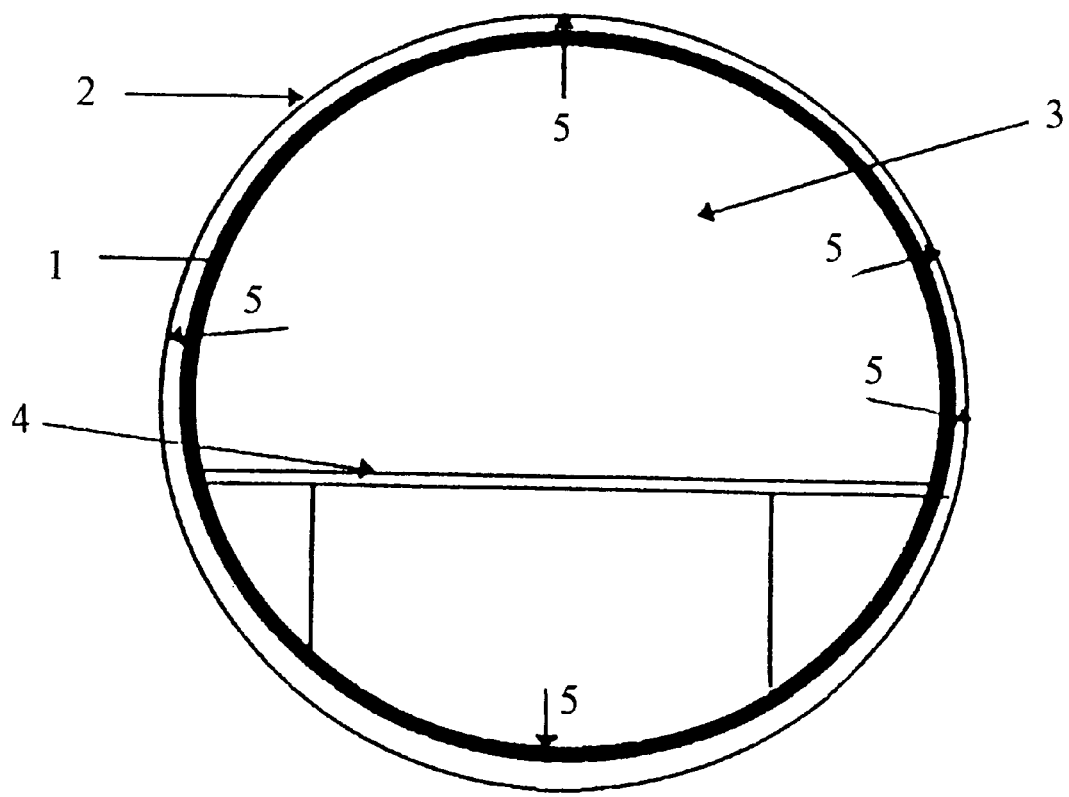
FIG. 1 shows a cross-section of an aircraft fuselage.

A fuselage consists of circumferential ribs (1) and lengthwise stringers attached by rivets to the outer metal skin (2) in an air-tight fashion. The interior of the formed pressure cabin (3) is sub-divided by one of several floors (4) and separating walls (not shown), but all sub-divisions are at the same pressure. During a high altitude flight, the outside pressure is much smaller than the pressure required inside the cabin and strong radial forces act on the circumferential ribs, stringers, and riveted metal skin. These forces are symbolically shown by the arrows (5).

If the absolute cabin pressure can be reduced by supplying the passengers with an increased oxygen partial pressure, without causing any passenger discomfort, the forces (5) acting on the circumferential ribs (1) and skin (2) can be reduced. Without reducing the safety factor and without increasing fatigue, the aircraft can fly at higher altitudes, i.e., until the old pressure differential is reached again. Alternatively, the structure could be built lighter. Each of the two cases would result in an increase in fuel efficiency.

A reduction of the pressure differential between inside and outside the cabin is also advantageous with respect to the effects of rapid decompression.

Figure 2:
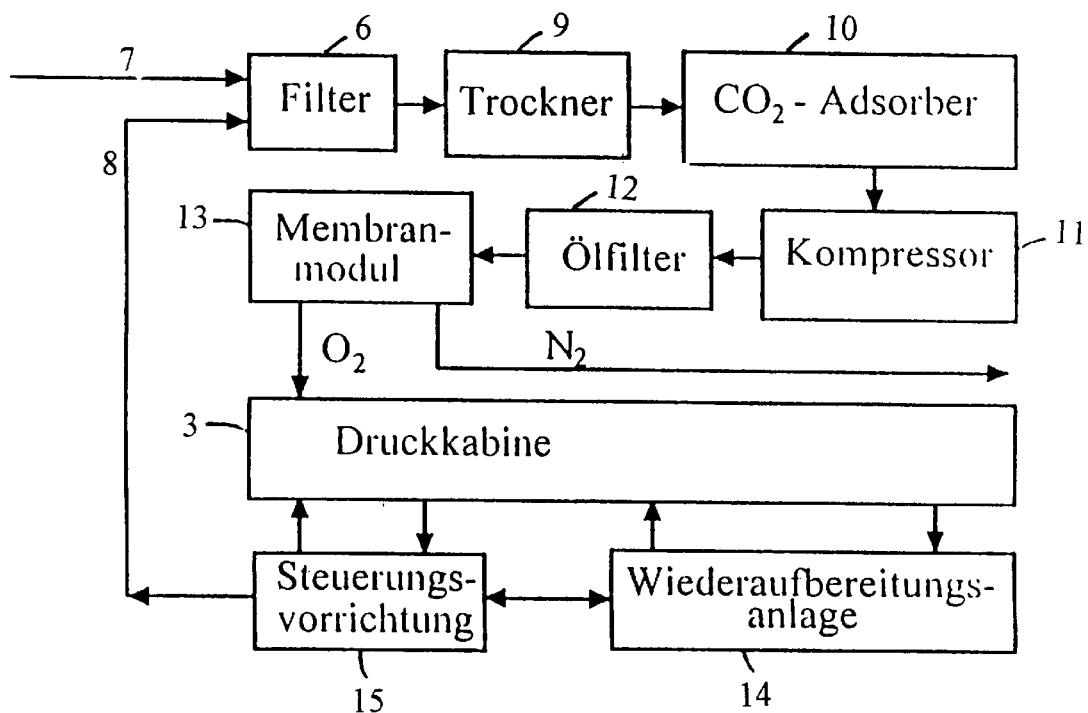
FIG. 2 shows the functional principles of an air supply unit for pressurized aircraft cabins according to the present invention.
Figure 3:
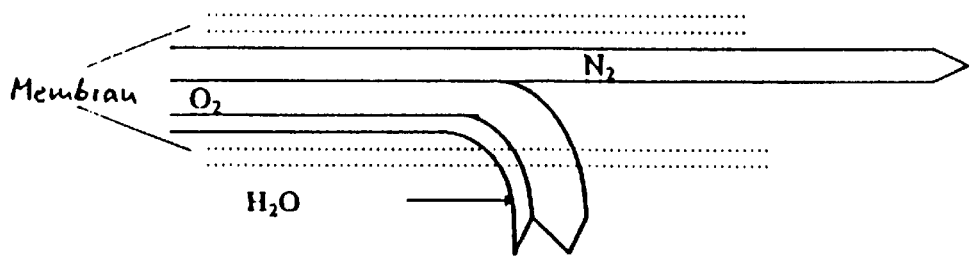
FIG. 3 shows a schematic representation of a membrane module as used in the present invention.

In the following, we refer to FIG. 2 in context with FIG. 3. FIG. 2 depicts the closed cycle process for producing oxygen-enriched air and for supplying air to a pressurized aircraft cabin (3). Initially, a dust filter (6) picks-up all particles contained in the air (7) originating outside the aircraft. The air is either ram-scooped or provided as bleed air from the engines, or originates from within the aircraft, i.e., the recirculation duct (8) from the cabin. An air dryer (9) reduces the humidity of the pre-filtered air as desired. Subsequently, a carbon dioxide absorber (10) removes the $CO_2$ in a known fashion. The relative and absolute quantity of oxygen emerging on the low pressure side of the hollow fiber diffusion filter module (13) depends on the pressure and the temperature of the air on the high pressure side of the filter module (13). Thus, an air compressor and an oil filter are integrated with the membrane module. The oil filter is required to prevent the membrane filter from becoming dirty from compressor oil. The membrane module (13) consists of many bundles of hollow fibers, allowing different gases to diffuse through at different speeds and thus resulting in a tool having the function of a differential gas filter. The compressed air (previously cleaned of $CO_2$) is pressed through the filter. $N_2$ is held back (and released to the atmosphere), while $O_2$ and $H_2O$ diffuse and lead to oxygen-enriched air on the low pressure side. The principle function of the system is schematically depicted in FIG. 3. It does not contain any moving parts and is thus maintenance free. If air at a pressure of 4 to 12 bars and a temperature of 20 degrees C is pressed through a typical membrane module, the permeated gas mixture will have an oxygen concentration of 40%. Further, the air is absolutely clean and free of bacteria. A re-circulation unit (14) consisting of an air filter, an odor absorber, and an ACS unit regenerates the re-circulated cabin air (3). A control unit (15) senses and sets the oxygen partial pressure in the cabin (3) and sets the desired cabin air pressure and controls the percentage of re-circulation via the filter (6).

What is claimed is:

1. A system for supplying air to pressurized aircraft cabins, comprising:

a filter arrangement that filters fresh air from outside an aircraft cabin and cleans said fresh air of gaseous pollutants;

a membrane module including a membrane comprising hollow fibers for oxygen enrichment of filtered and cleaned fresh air;

a conducting arrangement that conducts filtered and cleaned fresh air into said cabin from said membrane module; and a unit for cleaning and recirculating used cabin air into said cabin.

2. The system according to claim 1, wherein said gaseous pollutants include ozone and carbon dioxide.

3. The system according to claim 1, wherein said membrane module for oxygen enrichment is arranged to extract oxygen from air of standard composition.

4. The system according to claim 1, wherein said membrane module includes an air compressor on an entry side of said membrane module.

5. The system according to claim 1, wherein said air in said cabin has an air pressure, and said oxygen in said cabin has a partial pressure, further comprising a control unit for controlling said air pressure in said cabin dependent upon said partial pressure of said oxygen in said cabin.

* * * * *